United States Patent [19]

Airhart

[11] Patent Number: 4,803,669
[45] Date of Patent: Feb. 7, 1989

[54] THREE-COMPONENT THREE-DIMENSIONAL SEISMIC DATA ACQUISITION

[75] Inventor: Tom P. Airhart, Plano, Tex.

[73] Assignee: Atlantic Richfield Company, Los Angeles, Calif.

[21] Appl. No.: 944,401

[22] Filed: Dec. 19, 1986

[51] Int. Cl.$^4$ ............................................. G01V 1/00
[52] U.S. Cl. ...................................... 367/72; 367/59; 367/56
[58] Field of Search .................. 181/111, 112; 367/19, 367/21, 56, 58, 59, 72, 75, 73; 364/421, 582

[56] References Cited

U.S. PATENT DOCUMENTS 3,378,096  4/1968  Cherry, Jr. ............................ 367/75
3,716,111  2/1973  Lavergne .............................. 367/75

FOREIGN PATENT DOCUMENTS 2501869  9/1982  France .

OTHER PUBLICATIONS

Cunningham et al., "Three-Dimensional P and S Wave Velocity Structures of Southern Peru and Their Tectonic Implications", *Journal of Geophysical Research*, vol. 91, No. B9, pp. 9517–9532, Aug. 10, 1986.
Bone et al., "Analysis of Seismic Data Using Horizontal Cross-Sections", *Geophysics*, vol. 48, No. 9, pp. 1172–1178, Sep. 1983.
Walton, "Three-Dimensional Seismic Method", Geophysics, vol. 37, No. 3, pp. 417–430, Jun 1972.
Roecker, "Velocity Structure of the Pamir–Hindu Kush Region: Possible Evidence of Subducted Crust", Journal of Geophysical Research, vol. 87, No. B2, pp. 945–959, Feb. 10, 1982.
Thurber, "Earthquake Locations and Three-Dimensional Crustal Structure in the Coyote Lake Area, Central California", Journal of Geophysical Research, vol. 88, No. B10, pp. 8226–8236, Oct. 10, 1983.
Aki et al., "Determination of Three-Dimensional Velocity Anomalies Under a Seismic Array Using First P Arrival Times from Local Earthquakes, No. 1 A Homogeneous Initial Model", Journal of Geophysical Research, vol. 81, No. 23, pp. 4381–4399, Aug. 10, 1976.
Bone, "A Case History of 3D Seismic Application in the Gulf of Mexico", printed by Geophysical Service Inc., copyright Offshore Technology Conference, 1981.
Karlsson, "Application of New 3D Technology", Oil and Gas Journal, pp. 46–52, Nov. 3, 1986.

*Primary Examiner*—Thomas H. Tarcza
*Assistant Examiner*—Ian J. Lobo
*Attorney, Agent, or Firm*—Robert D. Lott

[57] ABSTRACT

Three-component three-dimensional seismic data is acquired by locating a plurality of receivers off the seisimic shot line of a seismic source. The angle between the seismic shot line and a line extending between the seismic source and each receiver is used to normalize the signals generated by the two shear wave detectors in each receiver by mathematically rotating the orientation of the receiver and the orientation of the seismic source to produce horizontal shear wave signals and vertical shear wave signals generally equivalent to those that would have been produced if each receiver and seismic source were aligned along a seismic shot line.

2 Claims, 2 Drawing Sheets

THREE-COMPONENT THREE-DIMENSIONAL SEISMIC DATA ACQUISITION

BACKGROUND OF INVENTION (1) Field of Invention

This invention relates generally to the field of seismic prospecting and more particularly to three-component three-dimensional seismic data acquisition.

(2) Description of the Prior Art

In traditional methods of generating seismic data a straight line, referred to as a seismic shot line, is established on the terrain and seismic receivers are placed along the line and injections of acoustic energy into the subsurface are made at points (referred to as shot points) along the line. While the shot line is not necessary in seismic studies involving only compressional waves, it is necessary for shear wave seismic studies since the generation and detection of horizontal shear waves and vertical shear waves is always with respect to the vertical plane (referred to as the seismic plane) which includes the shot line.

An emerging area of seismic technology is the effort to produce three-dimensional images of the subsurface. Since the seismic data produced along a shot line provides two-dimensional images, the principle method for producing three-dimensional images in the past has been to make seismic measurements along a plurality of parallel shot lines and to combine the two-dimensional seismic data by extrapolating between the shot lines to provide the three-dimensional subsurface images. However, this method of generating three-dimensional seismic data on land surfaces has at least two drawbacks. First, a relatively large number of shot lines need to be made which involve the process of producing a large number of seismic energy injections into the ground which is generally very time consuming. Moreover, in some areas it is not possible to produce the desired parallel seismic shot lines due to geologic formations at the surface such as large rocks, deep depressions, and surface textures which are not well suited for seismic sources.

Therefore, it can be appreciated that a procedure for acquiring three-dimensional subsurface seismic data which does not require a relatively large number of seismic shot points and which is able to work around surface irregularities is highly desirable.

SUMMARY OF THE INVENTION

It is, therefore, an object of this invention to provide a method for acquiring three-dimensional subsurface seismic data with a relatively small number of shot points.

It is also an object of this invention to provide a method for producing three-dimensional seismic data in places where surface conditions do not permit closely aligned parallel seismic shot lines.

It is still another object of this invention to produce three-component three-dimensional seismic data for a volume of the subsurface.

As shown in an illustrated embodiment of the invention, a method for acquiring three-component three-dimensional seismic data in which at least one receiver used to produce the acquisition does not lie on a seismic shot line of the seismic source involves first determining the angle between the shot line of the seismic source and the line between the off-line receiver and the shot point, and the angle between the shot line of the receiver and the line between the off-line receiver and the shot point. The signals received by the two horizontal shear wave detectors in the off-line receiver are normalized to produce a signal equivalent to that which would have been detected by an in-line shear wave detector and a cross-line shear wave detector respectively if the receiver and the acoustic source had both been oriented along a shot line coincident with the line between the receiver and the seismic source.

BRIEF DESCRIPTION OF THE DRAWINGS

The aforementioned and other features, characteristics, advantages, and the invention in general, will be better understood from the following more detailed description taken in conjunction with the accompanying drawings in which.

Figure 1:
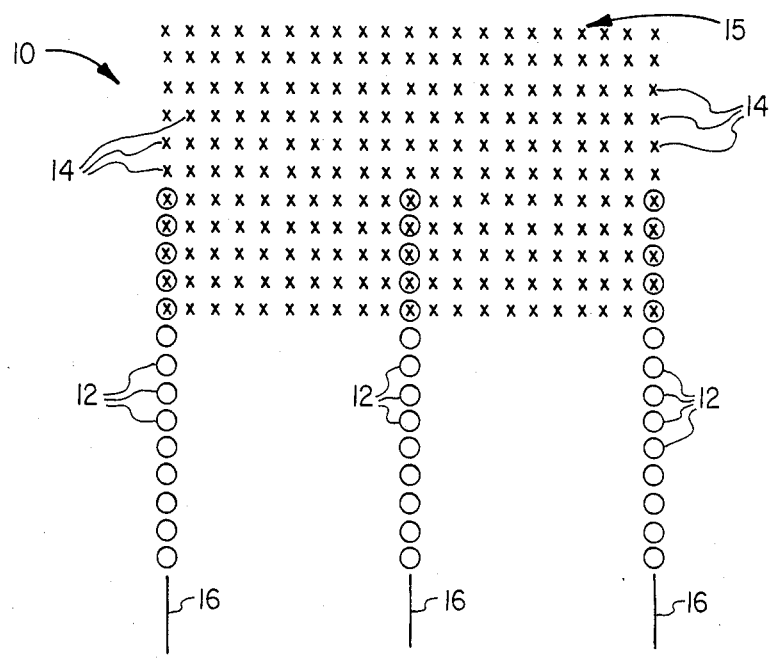
FIG. 1 is a plan view of the location of shot points and the location of seismic receivers in accordance with this invention.

It will be appreciated that for simplicity and clarity of explanation, the drawings have not necessarily been drawn to scale and reference numerals have been repeated as considered appropriate to indicate corresponding features.

DETAILED DESCRIPTION OF THE PREFERRED EMBODIMENT

The present invention relates to the processing resolution of detected shear wave components required for three-component three-dimensional seismic data acquisition and processing. This is accomplished in the preferred embodiment by using a matrix of seismic receivers in which the signals detected by the three orthogonal detectors of virtually every receiver from every injection of seismic energy into the subsurface are combined to form a three-component three-dimensional data pattern.

Turning now to the drawings, FIG. 1 is a plan view of a seismic acquisition layout shown generally as a element 10, showing the preferred locations of shot points 12 of seismic source injection and the locations of seismic receivers 14 according to the present invention. The locations of the shot points 12 are shown as circles in FIG. 1 while the locations of the receivers 14 are shown as "X"s. The receivers form a rectangular matrix 15 and the shot points 12 are along three seismic lines 16 which are perpendicular to the long dimension of the matrix 15. The three seismic lines 16 are positions at each end and in the middle of the matrix 15. The shot points 12 begin below the matrix 15 and extend up into the matrix 15 about half way through the short dimension of the matrix 15.

Each of the shot points 12 is individually and sequentially excited so that only one seismic signal is injected into the subsurface at any one time. For each seismic energy injection, all of the receivers 14 are activated and data is taken from all three of the orthogonal detectors of each of the receivers 14.

Advantageously, and in the preferred embodiment of the present invention, each of the seismic energy injections provides both compressional and shear seismic waves in the subsurface. The compressional seismic waves, in which the particle motion is in line with the direction of the propagation of the wave, are for the most part not dependent upon the horizontal orientation of the receiver or of the seismic source. Thus, in the receivers the compressional element of the seismic wave is detected by a motion detector which detects particle motion perpendicular to the surface.

In contradistinction, horizontal shear waves and vertical shear waves, in which the particle motion is perpendicular to the line of propagation, are defined relative to the seismic plane. More specifically, horizontal shear waves are defined as having particle motion which is perpendicular to the seismic plane while vertical shear waves are defined as having particle motion which is in the seismic plane. Therefore, in the receiver 14 horizontal shear waves are detected by means of a detector (the SH detector) which detects particle motion that is perpendicular to a seismic plane while the vertical shear waves are detected by means of a detector (SV detector) which detects particle motion parallel to the seismic plane. Further, the seismic source is conventionally operated to produce either vertical shear waves (SV) by producing shear wave particle motion which lies in the seismic plane or horizontal shear waves (SH) by operating the seismic source to produce particle motion in the subsurface which is perpendicular to the seismic plane. Thus, at least two signal injections are required to provide both horizontal shear waves and vertical shear waves according to methods commonly known in the art. By the use of a full waveform seismic source, such as the inclined ARIS seismic source developed by ARCO Oil and Gas Company, compressional and shear waves can be combined in each single injection.

In practice, vertical shear waves are generated by impacting a mass on a line towards the receiver and impacting again on the same line, but away from the receiver. Similarly, horizontal shear waves are generated by impacting the mass along the line perpendicular to the seismic line in one direction and then moving the direction of impact 180 degrees so it is still along the perpendicular line, but in the other direction.

As presently practiced in the art, the production and detection of true vertical shear waves and horizontal shear waves requires the seismic source and the receiver be aligned along the seismic line as described above. However, as can be seen from FIG. 1, restricting the seismic data to only those receivers 14 which lie in line with each of seismic lines 16 greatly reduces the amount of data received from operation of the full waveform seismic source and moreover only produces two-dimensional images of the subsurface. If the receivers 14 which do not lie along the seismic line 16 were used to record the seismic data generated at the shot points 12 which lie along one of the seismic lines 16, the data would not be a true indication of the horizontal shear waves and vertical shear waves due to the misalignment of the detectors in the receivers and the orientation of the seismic sources.

Figure 2:
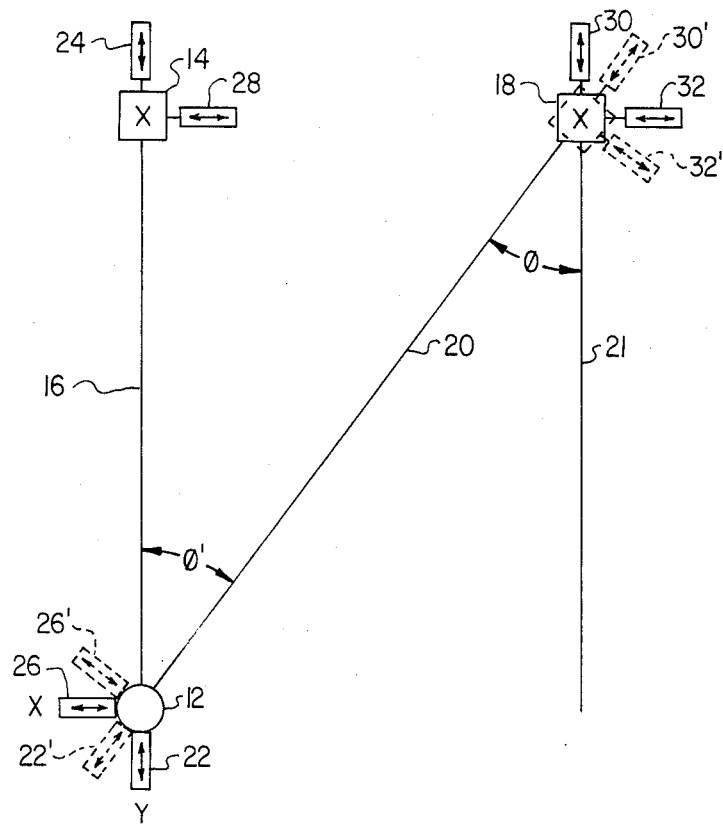
FIG. 2 is a detail of a portion of FIG. 1 showing a single shot point and two seismic receivers.

This misalignment problem is shown graphically in FIG. 2 in which a shot point 12 lying along a seismic line 16 produces seismic energy which is received by in-line receiver 14 and an off-line receiver 18 which is one of the receivers 14 of FIG. 1 which does not lie along the seismic line 16. Line 20 extends between the receiver 18 and the shot point 12. The receiver 18 is oriented along a shot line 21, which in the preferred embodiment is parallel with the shot line 16. For purposes of the discussion herein, a receiver is oriented along a shot line if its in-line shear wave detector is located so that it will produce a maximum output signal for a vertical shear wave propagating along the shot line, and its cross-line shear wave detector is located so that it will produce a maximum output signal for horizontal shear wave also propagating along the shot line.

Angle $\phi$ is the included angle between the line 20 and the receiver shot line 21, while angle $\phi'$ is the included angle between the line 20 and the seismic source shot line 16. Since in the preferred embodiment the shot lines 16 and 21 are parallel (i.e., the receivers are all oriented along parallel shot lines) angles $\phi$ and $\phi'$ are equal to each other.

When a seismic source is operated at shot point 12 in FIG. 2 in the SV orientation to produce vertical seismic waves as shown by a source directional symbol 22, receiver 14 will detect such vertical seismic waves in its SV detector 24. Conversely, when the seismic source is in the SH orientation as shown by a source directional symbol 26 to generate horizontal shear waves, such horizontal shear waves will be detected in the receiver 14 by the SH detector 28.

However, when the seismic source is operated to produce vertical shear waves, the seismic receiver 18 will detect subsurface seismic data in both its in-line shear wave detector represented by element 30 and its cross-line shear wave detector represented by element 32. Conversely, the injection of horizontal shear waves by the seismic source at injection point 12 will produce seismic data and the detector 30 and 32 of the receiver 18 also.

Clearly, if the seismic source at injection point 12 could be rotated to form a seismic line with each of the receivers 14 of FIG. 1, and if each of the receivers 14 of FIG. 1 could be in turn rotated to be oriented along a seismic line joining each of the shot points 12 as they are energized, then a large number of two-dimensional seismic planes would be generated which could then be combined to form a three-dimensional image of the subsurface. However, such an orientation of the seismic source and the separate injection of seismic energy for each of the angles represented by each of the receivers 14 and the concurrent orientation of each of the receivers 14 would simply require too much time and be too costly for the amount of extra data to be received.

Advantageously, however, it is taught by the present invention that it is not necessary to physically reorient each of the seismic sources and each of the receivers 14, but rather that this rotation of the receiver and the seismic source can be performed mathematically to produce data generally equivalent to that which would have been produced if the seismic source and receivers would have been rotated along each line joining each of the shot points 12 and receivers 14. The process steps for this rotation of the receiver and seismic source coordinates is shown in FIGS. 3a, 3b, and 3c.

Figure 3A:
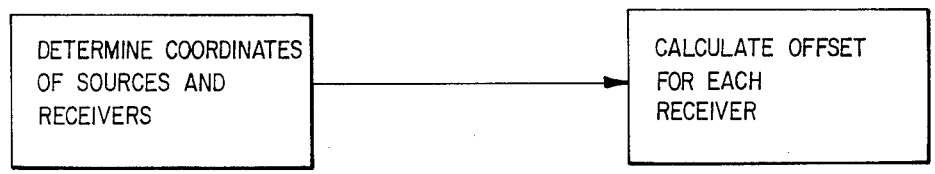
FIGS. 3a–3c are block diagrams of the process used to achieve the three-component three-dimensional seismic data acquisition in accordance with this invention.

The first step of the process, as shown in FIG. 3a, is to determine the coordinates of the receiver and the source and to calculate the angle of offset for a line extending between each receiver and source with respect to the seismic lines along which the respective receiver and source are oriented. In the preferred embodiment of FIG. 1 and FIG. 2 all the receivers 14 are oriented in a line parallel to the seismic lines 16 and the seismic sources are always oriented in line with the seismic lines 16. In FIG. 2 this angle is shown as $\phi$. However, it will be appreciated by those skilled in the art that it is not necessary for the receivers 14 to all be oriented the same direction nor is it necessary for the seismic sources to be oriented along any particular seismic line or to be oriented for that matter with respect to each other. This latter freedom of orientation of the seismic sources is particularly useful in terrain in which obstacles may prevent the seismic source from being oriented in a particular direction.

Figure 3B:
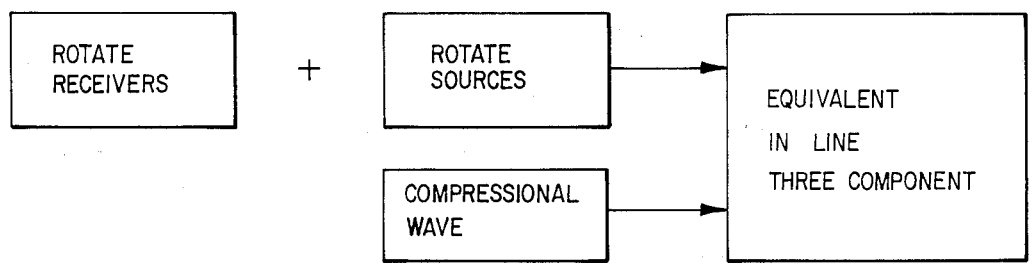
Figure 3C:
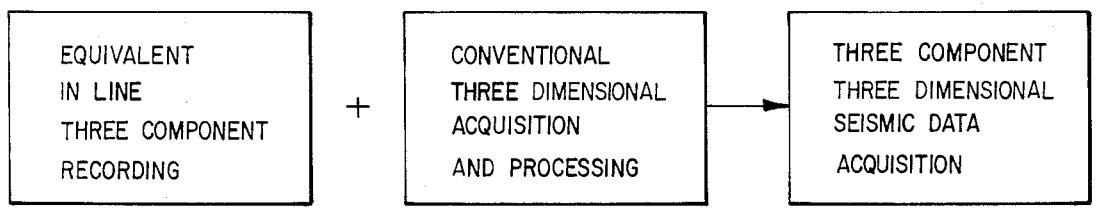

Turning now to FIG. 3b, after the angle of offset has been calculated for each receiver, the seismic data received from the two shear wave detectors are normalized by mathematical rotation to compensate for the offset angle by performing a rotation transform on the receivers and a rotation transform on the sources. These two rotation transformations are combined with the compressional wave which is independent of the horizontal or azimuthal orientation of the receivers and the sources to produce the equivalent in-line three-component seismic data.

The receiver rotation transformation results in mathematically rotating the SV detector 30 (as shown in FIG. 2) to a position in line with line 20 as shown as a rotated SV detector position 30'. Similarly, the rotation of the SH detector 32 to a position perpendicular to line 20 is shown as a rotated SH detector position 32'. Correspondingly, the rotation of the seismic source results in rotating the SV source direction signal 22 to a position which is in line with line 20 as indicated by the rotated source directional symbol 22'. Similarly the SH source directional symbol 26 is rotated into a position which is perpendicular to line 20 as indicated by the rotated source directional symbol 26'.

It is convenient to define the recordings from the SV detector 30 and SH detector 32 of receiver 18 for injections of seismic signal into shot point 12 when the injected seismic signal is in the SV orientation (indicated by source direction symbol 22) and when the injected seismic signal is in the SH orientation (indicated by seismic directional symbol 26). These definitions are as follows:

$U^{22}_{30}$ is the signal generated by detector 30 in response to a seismic signal injected at shot point 12 when the seismic source is in the SV orientation as represented by the source orientation symbol 22. $U^{22}_{32}$ represents the signal generated by the SH detector 32 of receiver 18 in response to a seismic signal injected at shot point 12 when the seismic source is in the SV orientation as indicated by symbol 22. $U^{26}_{30}$ represents the signal generated by the SV detector 30 of receiver 18 in response to a seismic signal injected a shot point 12 by a seismic source in the SH orientation as indicated by symbol 26. $U^{26}_{32}$ is a signal generated by the SH detector 32 of receiver 18 in response to a seismic signal injected at shot point 12 by a seismic source in the SH orientation as represented by symbol 26.

The following four equations operate to rotate the receiver to produce signals which would be equivalent to a receiver 18 having an SH detector and SV detector oriented perpendicular to and in line with a line 20, respectively:

$$U^{22}_{30'} = U^{22}_{30} \cos \phi - U^{22}_{32} \sin \phi \quad (1)$$

$$U^{22}_{32'} = U^{22}_{30} \sin \phi + U^{22}_{32} \cos \phi \quad (2)$$

$$U^{26}_{30'} = U^{26}_{30} \cos \phi - U^{26}_{32} \sin \phi \quad (3)$$

$$U^{26}_{32'} = U^{26}_{30} \sin \phi + U^{26}_{32} \cos \phi \quad (4)$$

where $U^{22}_{30'}$ is a signal detected by the rotated SV detector 30' in response to a seismic injection at shot point 12 by a seismic source in the SV orientation indicated by symbol 22; $U^{22}_{32'}$ is the signal generated by the rotated SH detector 32' in response to a seismic injection at shot point 12 by a seismic source in the SV orientation as indicated by symbol 22; $U^{26}_{30'}$ is a signal generated by the rotated SV detector 30' in response to a seismic injection at shot point 12 by a seismic source in the SH orientation as indicated by symbol 26; and $U^{26}_{32'}$ is a signal generated by the rotated SH detector 32' in response to a seismic injection at shot point 12 by a seismic source in the SH orientation as indicated by symbol 26.

The rotation of the sources is accomplished using the following equations:

$$U^{22'}_{30'} = U^{22}_{30'} \cos \phi' - U^{26}_{30'} \sin \phi' \quad (5)$$

$$U^{26'}_{30'} = U^{22}_{30'} \sin \phi' + U^{26}_{30'} \cos \phi' \quad (6)$$

$$U^{22'}_{32'} = U^{22}_{32'} \cos \phi' - U^{26}_{30'} \sin \phi' \quad (7)$$

$$U^{26'}_{32'} = U^{22}_{32'} \sin \phi' + U^{26}_{30'} \cos \phi' \quad (8)$$

where $U^{22'}_{32'}$ is a signal generated by the rotated SV detector 30' in response to a seismic injection at shot point 12 from a seismic source in the rotated SV orientation as indicated by symbol 22'; $U^{26'}_{30'}$ is a signal generated by the rotated SV detector 30' in response to a seismic injection at shot point 12 from a seismic source in the rotated SH orientation as indicated by symbol 26'; $U^{22'}_{32'}$ is a signal generated by the rotated SH detector 32' of receiver 18 in response to a seismic injection at shot point 12 from a seismic source in the rotated SV orientation as indicated by symbol 22'; and $U^{26'}_{32'}$ is a signal generated by the rotated SH detector 32' in response to a seismic injection at shot point 12 from a seismic source in the rotated SH orientation indicated by symbol 26'.

$U^{26'}_{30'}$ represents the SV detection of waves generated by seismic source in the SH orientation and, to a first approximation, is essentially zero. Similarly, $U^{22'}_{32'}$ is a response of a SH detector to a signal generated by a seismic source in the SV orientation and, to a first approximation, is also essentially zero.

$U^{22'}_{30'}$ is the response of the rotated SV detector of the receiver 18 in response to the rotated SV orientation of a seismic source at shot point 12, and equations 5, 1, and 3 can be combined to provide $$\begin{aligned} U^{22'}_{30'} = U(SV) = \\ U^{22}_{30} \cos \phi \cos \phi' - U^{22}_{32} \sin \phi \cos \phi' - \\ U^{26}_{30} \sin \phi' \cos \phi + U^{26}_{32} \sin \phi \sin \phi'. \end{aligned}$$

Similarly, $U^{26}_{32}$ represents the shear wave energy detected by the rotated shear wave detector 32 in response to a seismic injection at shot point 12 from a seismic source in the rotated SH orientation, and equations 8, 2, and 4 can be combined to form $$\begin{aligned} U^{26'}_{32'} = U(SH) = \\ U^{22}_{30} \sin \phi \sin \phi' + U^{22}_{32} \sin \phi' \cos \phi + \\ U^{26}_{30} \sin \phi \cos \phi' - U^{26}_{32} \cos^2 \phi. \end{aligned}$$

As shown in FIG. 3C, this equivalent in-line three-component recording is combined with conventional three-dimensional acquisition and processing to produce the three-component three-dimensional seismic data acquisition. Conventional three-dimensional processing is known in the art.

The present invention thus provides a method for producing a large number of equivalent two-dimensional seismic images of the subsurface, one for each line joining a seismic injection point and a receiver. This data can also be acquired in areas in which it would be very difficult, if not impossible, to establish a traditional seismic line due to obstacles in the terrain, but where receivers could be mounted to thus receive seismic data from seismic sources in areas not obstructed by the terrain.

Although the invention has been described in part by taking detailed reference to a specific embodiment, such detail is intended to be and will be understood to be instructive rather than restrictive. It will be appreciated by those in the art that many variations may be made in the structure and mode of operation without departing from the spirit and scope of the invention, as disclosed in the teachings contained herein. For example, this invention can be used with vertical seismic profile seismic surveys as well as surface surveys.

What is claimed is:

1. A method for producing three-component three-dimensional seismic data for use in analyzing subsurface structures in which at least one receiver used to produce such acquisition does not lie on a seismic line of the seismic source comprising the steps of:
    (a) establishing a connect line joining said off-line receiver and said seismic source at a location where said seismic source injects a seismic signal into the subsurface having shear wave components, and determining the angle between said connect line and the source shot line and the angle between said connect line and the receiver shot line; and
    (b) normalizing the signals received by two shear wave detectors of said receiver by performing a mathematical rotation transformation on said receiver and a mathematical rotation transformation on said source to produce a signal equivalent to what would have been detected by said two shear wave detectors if said receiver and said seismic source had been physically oriented along a seismic line extending between said acoustic source and said receiver.

2. In a process for accumulating and processing seismic shear wave data, the improvement comprising the steps of:
    (a) locating at least one receiver off of a seismic shot line, said receiver having a shear wave detector oriented perpendicular to a receiver shot line and a shear wave detector parallel to said shot line;
    (b) producing by a seismic source located on said seismic shot line a horizontal shear wave in the subsurface perpendicular to said seismic shot line and a vertical shear wave in the subsurface perpendicular to said horizontal shear waves;
    (c) determining the angle between said seismic shot line and a line between said seismic source and said receiver, the angle between said receiver shot line and said line between said seismic source and said receiver;
    (d) normalizing signals produced by said two shear wave detectors of said receiver by performing a mathematical rotation transformation on said receiver and a mathematical rotation transformation on said source to a value generally equivalent to those signals which would have been produced if (i) one of the said shear wave detectors had been oriented perpendicular to said line between said receiver and said seismic source, (ii) the other of said shear wave detectors had been oriented perpendicular to said line joining said receiver and said seismic source, (iii) said horizontal shear wave generated by said seismic source had been generated perpendicular to said line joining said receiver and said seismic source, and (iv) said vertical shear wave lines generated by said seismic source had been generated parallel with said line joining said seismic source and said receiver;
    (e) separating said normalized data for a first plurality of portions of the subsurface lying beneath said line joining said receiver and said seismic source; and
    (f) repeating steps (a) through (e) for a second plurality of receivers in a third plurality of locations of said seismic source and combining the respective data for each of said first plurality of portions of the subsurface intersected to produce a three-dimensional image of the subsurface.

* * * * *